US012621281B2

(12) United States Patent
Jeong

(10) Patent No.: US 12,621,281 B2
(45) Date of Patent: May 5, 2026

(54) EXTENSIBLE SERVER MANAGEMENT FRAMEWORK BASED ON REVERSE CONNECTION PROTOCOL AND OPERATION METHOD THEREOF AND ACCESS OPERATING METHOD THEREOF

(71) Applicant: AlpacaX Inc., San Jose, CA (US)

(72) Inventor: Eunyoung Jeong, Seoul (KR)

(73) Assignee: AlpacaX Inc., San Jose, CA (US)

( * ) Notice: Subject to any disclaimer, the term of this patent is extended or adjusted under 35 U.S.C. 154(b) by 75 days.

(21) Appl. No.: 18/544,629

(22) Filed: Dec. 19, 2023

(65) Prior Publication Data

US 2024/0214366 A1 Jun. 27, 2024

(30) Foreign Application Priority Data

Dec. 21, 2022 (KR) ......................... 10-2022-0180378
Dec. 21, 2022 (KR) ......................... 10-2022-0180383

(51) Int. Cl.
*H04L 9/40* (2022.01)
*H04L 67/141* (2022.01)

(52) U.S. Cl.
CPC .............. *H04L 63/08* (2013.01); *H04L 63/10* (2013.01); *H04L 67/141* (2013.01)

(58) Field of Classification Search
CPC ........ H04L 63/08; H04L 63/10; H04L 67/141
USPC .......................................................... 726/4
See application file for complete search history.

(56) References Cited

U.S. PATENT DOCUMENTS

| | | | |
|---|---|---|---|
| 2012/0185563 A1* | 7/2012 | Sugiyama ........... | H04L 63/0281 709/217 |
| 2012/0324022 A1* | 12/2012 | Lowry .................... | H04L 67/55 709/206 |
| 2018/0310174 A1* | 10/2018 | Rougier ................ | H04W 12/04 |
| 2019/0052630 A1* | 2/2019 | Lapidous ............ | H04L 63/0853 |
| 2021/0064765 A1* | 3/2021 | Lapworth ............... | H04L 67/10 |
| 2021/0150423 A1* | 5/2021 | Tomosugi .............. | G06F 21/31 |

(Continued)

FOREIGN PATENT DOCUMENTS

| | | |
|---|---|---|
| JP | 04908609 B2 | 4/2012 |
| JP | 2020126385 A | 8/2020 |
| KR | 101727059 B1 | 4/2017 |

(Continued)

*Primary Examiner* — Meng Vang
(74) *Attorney, Agent, or Firm* — NKL Law; Jae Youn Kim

(57) ABSTRACT

A server management framework based on a reverse connection protocol according to various embodiments of the present disclosure may include: a user device; an agent installed in a server; and an integrated console, wherein the agent may be configured to request communication connection to the integrated console by a reverse connection protocol according to a command received from the integrated console, the integrated console may be configured to receive an access request to the server from the user device, and transmit an address of a connection socket to the user device and the agent, and the agent may be configured to create a shell, and request communication connection for the address of the connection socket, in response to receiving the address of the connection socket from the integrated console, and the user device and the server may be configured to be communication-connected through the connection socket. Various other embodiments are possible.

20 Claims, 8 Drawing Sheets

(56)  References Cited

U.S. PATENT DOCUMENTS

2022/0232066 A1 * 7/2022 Subramaniam ....... H04L 41/046
2024/0146731 A1 * 5/2024 Sivaram .............. H04L 63/0884

FOREIGN PATENT DOCUMENTS

KR          101805458 B1    12/2017
KR          101992976          6/2019
WO     WO-2021242226 A1 * 12/2021    ........... H04L 63/102
WO     WO-2022036134 A1 *  2/2022    .......... G06F 11/1469

* cited by examiner

EXTENSIBLE SERVER MANAGEMENT FRAMEWORK BASED ON REVERSE CONNECTION PROTOCOL AND OPERATION METHOD THEREOF AND ACCESS OPERATING METHOD THEREOF

CROSS-REFERENCE TO RELATED APPLICATION

This application claims under 35 U.S.C. § 119(a) the benefit of Korean Patent Application No. 10-2022-0180378 filed on Dec. 21, 2022, and Korean Patent Application No. 10-2022-0180383 filed on Dec. 21, 2022, the entire contents of which are incorporated herein by reference.

BACKGROUND

(a) Technical Field

The present disclosure relates to an extensible server management framework based on a reverse connection protocol and an operation method thereof and an access operating method thereof.

(b) Background Art

Secure Shell (SSH) has been used as the most standard server connection protocol for approximately 30 years up to now. End-to-end confidentiality and authenticity are guaranteed through an encrypted communication channel, and clients such as OpenSSH and PuTTY are utilized. However, the SSH exposes vulnerabilities to brute force and man-in-the-middle attacks by using password or public key-type login. To mitigate these risks, many studies have introduced additional security measures such as blocking root login, blocking remote access, and changing ports, but these reduce user convenience and work productivity.

In the SSH, user account and password verification are handled by a Pluggable Authentication Module (PAM). The PAM as an integrated UNIX authentication framework is a module that controls user authentication and authorization for an application program in the system. It is possible to add an authentication method such as Fast Identity Online (FIDO) by replacing the password in the PAM, but there is the inconvenience of having to implement a Service Programming Interface (SPI) appropriate for each module and register the SPI in the PAM. In other words, if the PAM is used, even if technology with enhanced convenience and safety is developed, it is difficult to apply the technology immediately.

Unlike the past, a current computing environment has become more diverse and the size of the infrastructure has grown due to cloud computing, IoT, and remote work, and as a result, difficulties in server management are increasing due to increasing security threats. At the time when the SSH or PAM is designed, the design is appropriate in terms of scale and security threats, but in the current environment, a server access authentication and management method using the SSH or PAM may not be efficient.

Accordingly, the need for a new server access method and authentication method to fundamentally replace the server access authentication and management method is emerging.

SUMMARY OF THE DISCLOSURE

The present disclosure is to provide a new server management framework based on a reverse connection protocol, which is practical and extensible, and is suitable for a current computing environment.

According to the present disclosure, the framework is replaced with an SSH and a PAM by the reverse connection protocol (e.g., a reverse shell protocol or SSH reverse tunneling), and is managed by accessing a server through an integrated console to provide convenience of maintenance.

Further, web authentication, and identity provider (IDP), multi factor authentication (MFA), etc., may also be flexibly introduced into an authentication method between a web server and a client. Through this, it is possible to design a practical framework that may safely and more conveniently manage large-scale servers.

Specifically, the present disclosure proposes a server management framework based on a reverse connection protocol, thereby additionally providing a function of allowing a web terminal of a server accessed by a user to be shared and collaborated with other persons, a detection and reporting function when an abnormal behavior occurs, a function of saving an audit record for work contents, and a function of reflecting changes through REST API when changing terminal attributes.

Technical problems to be achieved in the present disclosure are not limited to the aforementioned technical problems, and other technical problems not described above will be apparently understood to those skilled in the art from the following disclosure below.

A server management framework based on a reverse connection protocol according to various embodiments of the present disclosure may include: a user device; an agent installed in a server; and an integrated console, and the agent may be configured to request communication connection to the integrated console by a reverse connection protocol (e.g. reverse shell or SSH reverse tunneling) according to a command received from the integrated console, the integrated console may be configured to receive an access request to the server from the user device, and transmit an address of a connection socket to the user device and the agent, the agent may be configured to create a shell, and request communication connection for the address of the connection socket, in response to receiving the address of the connection socket from the integrated console, and the user device and the server may be configured to be communication-connected through the connection socket. Various other embodiments are possible.

DETAILED DESCRIPTION

Hereinafter, implementation examples and embodiments of the present disclosure will be described in detail so as to be easily implemented by those skilled in the art with reference to the accompanying drawings. The present disclosure may be implemented in various different forms, and is not limited to the implementation examples and embodiments described herein.

Specific structural or functional descriptions of the embodiments are disclosed only for illustrative purposes and may be modified and implemented in various forms. Accordingly, the embodiments are not limited to the specific disclosed form, and the scope of the present disclosure includes changes, equivalents, or substitutes included in the technical spirit.

The terms such as first or second may be used to describe various components, but these terms should be interpreted only for the purpose of distinguishing one component from another component. For example, a first component may be referred to as a second component, and similarly, the second component may also be referred to as the first component.

It should be understood that, when it is described that a component is "connected to" another component, the component may be directly connected to or access the other component or a third component may be present therebetween.

A singular form includes a plural form unless the context clearly dictates otherwise. It should be understood that the term "comprise" or "have" herein is intended to specify the presence of stated features, numbers, steps, operations, components, parts or the combination thereof, but not to preclude a possibility of the presence or addition of one or more other features, numbers, steps, operations, components, parts or combinations thereof, in advance.

Unless defined otherwise, all terms used herein including technological or scientific terms have the same meanings as those generally understood by those skilled in the art. The terms which are defined in a generally used dictionary should be interpreted to have the same meaning as the meaning in the context of the related art, and are not interpreted as an ideal meaning or excessively formal meanings unless clearly defined in this specification.

Figure 1:
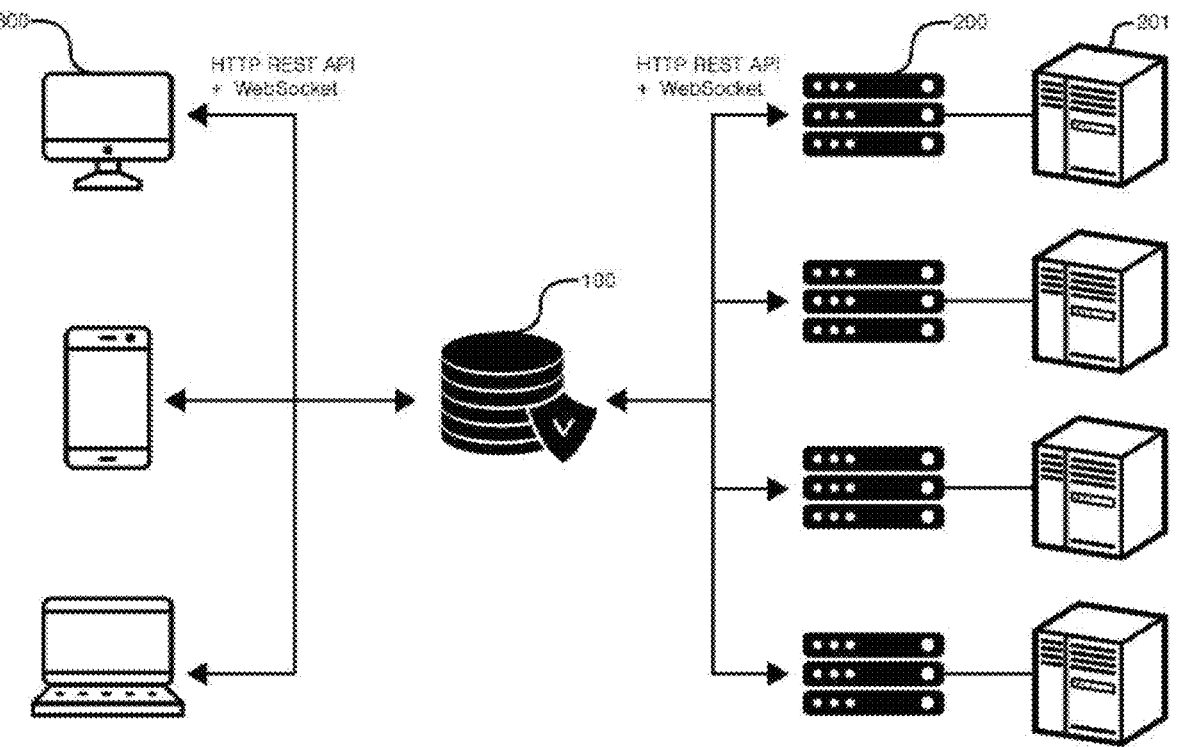
FIG. 1 shows an extensible server management framework based on a reverse connection protocol according to various embodiments of the present disclosure.

FIG. 1 shows an extensible server management framework 10 based on a reverse connection protocol according to various embodiments of the present disclosure.

As illustrated in FIG. 1, the reverse connection protocol based extensible server management framework (hereinafter, referred to as the framework) 10 according to various embodiments of the present disclosure may include an integrated console 100, an agent 200 installed in each server 201, and a user device 300.

The server 201 may be any type or combination of types of computing devices, such as a network server, a web server, a cloud server, a file server, a supercomputer, a desktop computer, etc. The user device 300 may be a network computing device used by general users who wish to access the server 201. The user device 300 may include various types of computing devices. For example, the user device 300 may include a portable device such as a mobile phone, smartphone, PDA, tablet, laptop, or other non-portable computing device such as a desktop or server. The user device 300 may have an application program installed for accessing the server 201. For example, a web browser application program may be installed in the user device 300. The web browser as a program that allows a user to use web (WWW: world wide web) services refers to a program that receives and displays hypertext written in hypertext mark-up language (HTML), and may include, for example, Netscape, Explorer, Chrome, etc.

The server 201 and the user device 300 are network connected to each other, and data and messages may be transmitted and received through the network. Here, the network connection refers to a connection structure in which information may be exchanged between nodes of respective entities included in the framework 10, and an example of such a network type which enables communication connection includes a Radio Frequency (RF), a 3rd Generation Partnership Project (3GPP) network, a Long Term Evolution (LTE) network, a World Interoperability for Microwave Access (WIMAX) network, Internet, a Local Area Network (LAN), a Wireless Local Area Network (LAN), a Wide Area Network (WAN), a Personal Area Network (PAN), a Bluetooth network, an NFC network, a satellite broadcasting network, an analog broadcasting network, a Digital Multimedia Broadcasting (DMB) network, etc., but is not limited thereto.

Meanwhile, data, messages and information exchanged between network computing devices such as the server 201 and the user device 300 through the network protocol exemplified above may be managed according to a communication protocol set in a communication protocol specification. Examples of the communication protocol may include Hyper Text Transfer Protocol (HTTP), Hyper Text Transfer Protocol Secure (HTTPS), File Transfer Protocol (FTP), Telnet (TErminaL NETwork), and Secure Shell (SSH). In particular, the Secure Shell (SSH) has been used as the most standard server connection protocol for approximately 30 years up to now. End-to-end confidentiality and authenticity are guaranteed through an encrypted communication channel, and clients such as OpenSSH and PuTTY are utilized. However, the SSH exposes vulnerabilities to brute force and man-in-the-middle attacks by using password or public key-type login. To mitigate these risks, many studies have introduced additional security measures such as blocking root login, blocking remote access, and changing ports, but these reduce user convenience and work productivity.

In the SSH, user account and password verification is handled by a Pluggable Authentication Module (PAM). The PAM as an integrated UNIX authentication framework is a module that controls user authentication and authorization for an application program in the system. It is possible to add an authentication method such as Fast Identity Online (FIDO) by replacing the password in the PAM, but there is the inconvenience of having to implement a Service Programming Interface (SPI) appropriate for each module and register the SPI in the PAM. In other words, if the PAM is used, even if technology with enhanced convenience and safety is developed, it is difficult to apply the technology immediately.

The framework 10 according to the present disclosure intends to utilize a webshell in terms of server management. The webshell is a compound word of web, which is an abbreviation for web page, and shell, which serves as an interface for issuing and executing commands to a server, and is a program created to execute commands on the server from the web page, and is generally used for the purpose of cyber attacks. A webshell attack begins when an attacker uploads a malicious program through a vulnerability in the web server. Using the webshell attack, the attacker may bypass a security system and access the system without separate authentication. Furthermore, when escalating an authority using an authority escalation vulnerability, the attacker may execute arbitrary commands and take complete control of the web server.

As an example of the reverse connection protocol, reverse shell is a method most often used by attackers such as hackers when accessing the shell of the web server to carry out a webshell attack. This reverse shell protocol is a protocol in which a target server requests a connection to an external attacker, and by linking the server's shell thereto, the attacker may execute commands. The attackers may use a reverse shell to bypass the Secure Shell (SSH), gain an access authority to the server, and execute arbitrary commands. Since the connection request is initiated from the target server, it is easy to evade firewalls and other security devices that may exist between the target server and the attacker.

Further, as another example of the reverse connection protocol, SSH reverse tunneling may be technology for accessing a server which may not be directly accessed through the Internet by a normal firewall. In general, SSH tunneling includes direct tunneling and reverse tunneling. In the direct tunneling, an SSH client listens on a specific port on a local host, and when a new connection is received, the SSH client transmits data to an SSH server, and the SSH server is connected to endpoints to transmit and receive data.

The SSH reverse tunneling, on the other hand, allows the SSH server to listen on a specific port on a remote host and when a new connection is received, the SSH server may transmit data to the SSH client, and the SSH client is connected to the endpoints to transmit and receive data. The SSH reverse tunneling may also be called remote port forwarding and may be used when the SSH server is positioned in the same network as the SSH client, or accesses another network service provided in the same host.

Meanwhile, the present disclosure is to provide a reverse connection protocol based server framework 10 which is practical and extensible, and is suitable for a current network computing device environment. In other words, the present disclosure may provide the reverse connection protocol based server framework 10.

The server management framework 10 using the reverse connection protocol according to the present disclosure may have extensibility in that the SSH may be completely excluded and all systems such as a server access protocol, authentication, management, etc., may be implemented in a new framework. Since the framework 10 according to the present disclosure is based on web technology, the framework 10 also has the possibility of utilizing the latest web authentication technology, JavaScript technology, etc.

In addition, the framework 10 according to the present disclosure has an effect of reducing an attack vector of the system in that any port is not bound to the server through the reverse connection protocol (for example, reverse shell protocol or SSH reverse tunneling). Bind shells such as SSH and Telnet bind specific ports and wait for external connection requests, which may be vulnerable to attacks such as brute force scans, etc.

Therefore, the framework 10 according to the present disclosure is intended to provide convenience of maintenance by replacing the SSH and the PAM with the reverse connection protocol and allowing access to and management of the server 201 through the integrated console 100.

Referring back to FIG. 1 again with the above understanding, the integrated console 100 may transmit a connection request signal or a signal for file upload and download commands to the agent 200 as the reverse connection protocol. For example, when there is a request from the user device 300 or a command according to a schedule is needed, the integrated console 100 delivers the command using a websocket command channel, and the agent 200 may perform the command and reports the result via API.

The integrated console 100 may serve as a gateway between the agent 200 (or server 201) and the user device 300. The integrated console 100 may be implemented using web standard technology and used through the web browser.

In order to implement a server management system using the reverse connection protocol, protocol specifications for real-time two-way communication and server control actions may be required. Connection of the user device 300 to the server 201 or agent 200 may be supported by a Representational State Transfer (REST) API.

First, in server management, all management actions may be expressed through the REST API. The REST means classifying resources by name and exchanging the states of those resources. The resource may be specified through an HTTP URI, actions such as querying, creating, modifying, or deleting the resource may be performed through HTTP methods such as GET, POST, PUT, and DELETE, and contents of the actions may be indicated through an HTTP message payload. When the command is intended to be executed on the server, the POST is requested by containing the content and the target of the command in an HTTP message.

The websocket may be used for real-time two-way communication for implementing the webshell, etc. Since the HTTP is a connectionless protocol in which the server does not preserve the state of the client, the HTTP does not support the real-time two-way communication. On the other hand, the websocket may be constructed with JavaScript, so the real-time two-way communication is supported through an independent TCP connection in an HTTP environment.

For example, when the user device 300 accesses the agent 200 of the server 201, the user device 300 may request a new session by transmitting a POST command, and at this time, the integrated console 100 may transfer a websocket address (URL) through which the user device 300 and the agent 200 may simultaneously access a session. The agent 200 may establish a connection with the integrated console 100 through a websocket address and link standard input and output to websocket input and output by executing a shell designated by the user, such as /bin/bash. At this time, since the websocket used for connection is a connection from the agent 200 to the integrated console, the connection may not be affected even by an inbound firewall without using a separate port.

Figure 2:
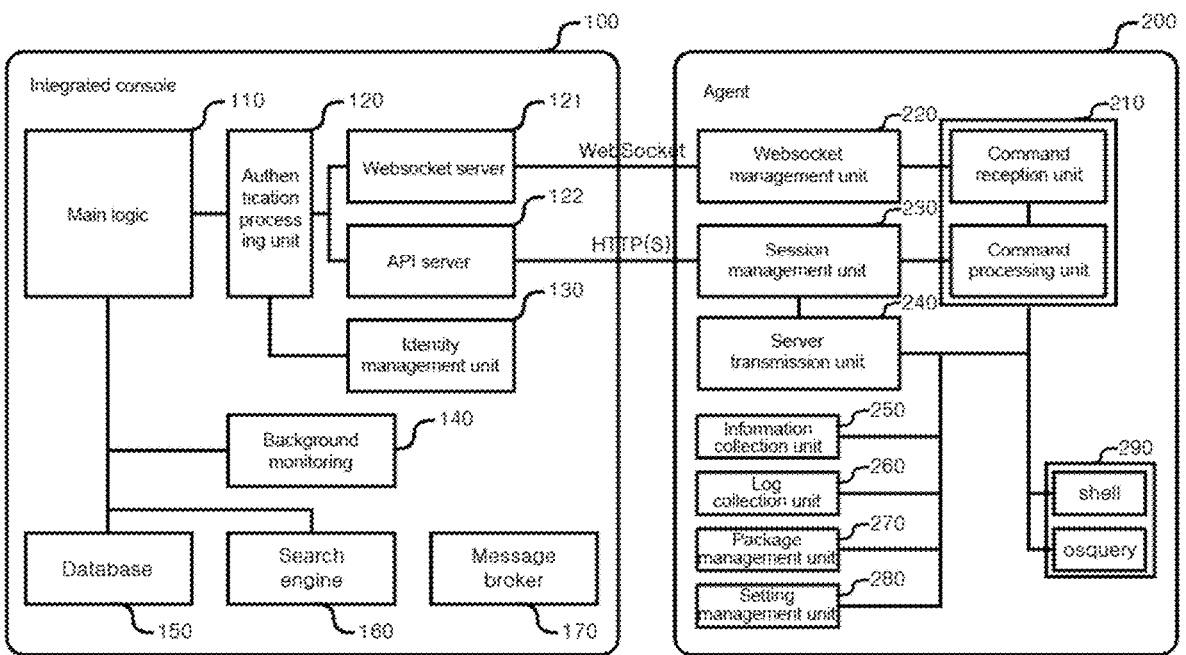
FIG. 2 is a block diagram of a configuration of an integrated console and an agent according to various embodiments of the present disclosure.

FIG. 2 is a block diagram of a configuration of the integrated console 100 and the agent 200 according to various embodiments of the present disclosure.

Referring to FIG. 2, the integrated console 100 may include a main logic 110, an authentication processing unit 120, a websocket server 121, an API server 122, an identity management unit 130, a background monitoring 140, a database 150, a search engine 160, and a message broker 170.

The main logic 110 may be logically connected to components included in the integrated console 100, such as the authentication processing unit 120 and the identity management unit 130, and control operations of the components. In other words, the main logic 110 may be a processor and may include any combination of a CPU, graphical processing units (GPU), a single core processor, a multi-core processor, application specific integrated circuits (ASIC), etc. The main logic 110 may be implemented as software and/or firmware in addition to hardware implementation. The software or firmware implementation of the main logic 110 may include computer- or machine-executable commands written in any appropriate programming language to perform various functions described above.

The authentication processing unit 120 may serve to authenticate server ID/KEY authentication, user token authentication, and user session authentication. The authentication processing unit 120 may be connected to the websocket server 121 and the API server 122, and collect/update information required for the server ID/KEY authentication, the user token authentication, and the user session authentication from the identity management unit 130. The identity management unit 130 may include information required for user personal management, group management, and membership management. Specifically, the identity management unit 130 may manage specifications of permissions, such as which user (or user device 300) is permitted to perform what task, and specifications of role-based permissions.

User authentication may be collectively managed with user information stored in the identity management unit 130 (or Identity Access Management (IAM) database) of the integrated console 100. If there is no account on the server 201 that the user or the user device 300 wants to access, the account on the server 201 may be created with information such as username, uid, shell, home directory, etc. stored in the identity management unit 130 immediately after the API request, and thereafter, the user device 300 may access the shell which the agent 200 creates in the server 201 by using the created account.

During this process, the integrated console 100 may validate an authentication and an authority of whether the user may actually access the server 201. While the integrated console 100 performs the authentication process instead of the individual server 201, various modernized web-based identity authentication methods may be used. For example, IDP such as Auth0 may be used, including a method in which MFA is applied to a password. An access authority to the server 201 may define which user or group has an authority to access the server through the API.

The background monitoring 140 may be executed in a background of the integrated console 100, and may be configured to monitor a server operation state, a network connections state, and a periodic task, and perform a specific routine according to the monitoring result. In the network connection state, a signal strength of the network connection may be continuously monitored, and the network connection may be managed based on each signal strength.

The database 150 may store and manage hardware information, operating system information, time information, network information, and user/group information of the server 201 collected from the agent 200.

Meanwhile, the search engine 160 may perform a function of searching commands, events, logs, etc. included in the integrated console 100, and the message broker 170 may serve to ensure a communication connection between the agent 200 and the user device 300 even though an intermittent connection or delay problem occurs in the framework 10. The message broker 170 may be configured as a queue manager to handle interactions between multiple message queues, with services providing data routing, message conversion, persistence, and client state management functions.

The agent 200 may include a command reception/processing unit 210, a websocket management unit 220, a session management unit 230, a server transmission unit 240, an information collection unit 250, a log collection unit 260, a package management unit 270, a settings management unit 280, and a system information collection unit 290.

The command reception/processing unit 210 may include a command reception unit and a command processing unit, which may be connected to the websocket management unit 220 and the session management unit 230, respectively.

The websocket management unit 220 may be connected to a websocket server 121 of the integrated console 100. The websocket management unit 220 may be connected to the websocket server 121 using a websocket URL received from the integrated console 100.

The session management unit 230 may be connected to the API server 122 of the integrated console 100. The information collection unit 250 may perform functions of event collection, event monitoring, command registration, command execution, and command result collection. Here, the event information may mean specific event information (for example, installation and driving start of the agent 200, etc.) that occurs in the agent 200 and the server 201.

The log collection unit 260 may manage log records, access content records, time records, operating status records, and user activity records. The package management unit 270 may perform functions of package registration, installation, update, deletion, and history management. The settings management unit 280 may block the SSH, and perform functions of integrated firewall setting, access authorization management, and authority elevation management.

Figure 3:
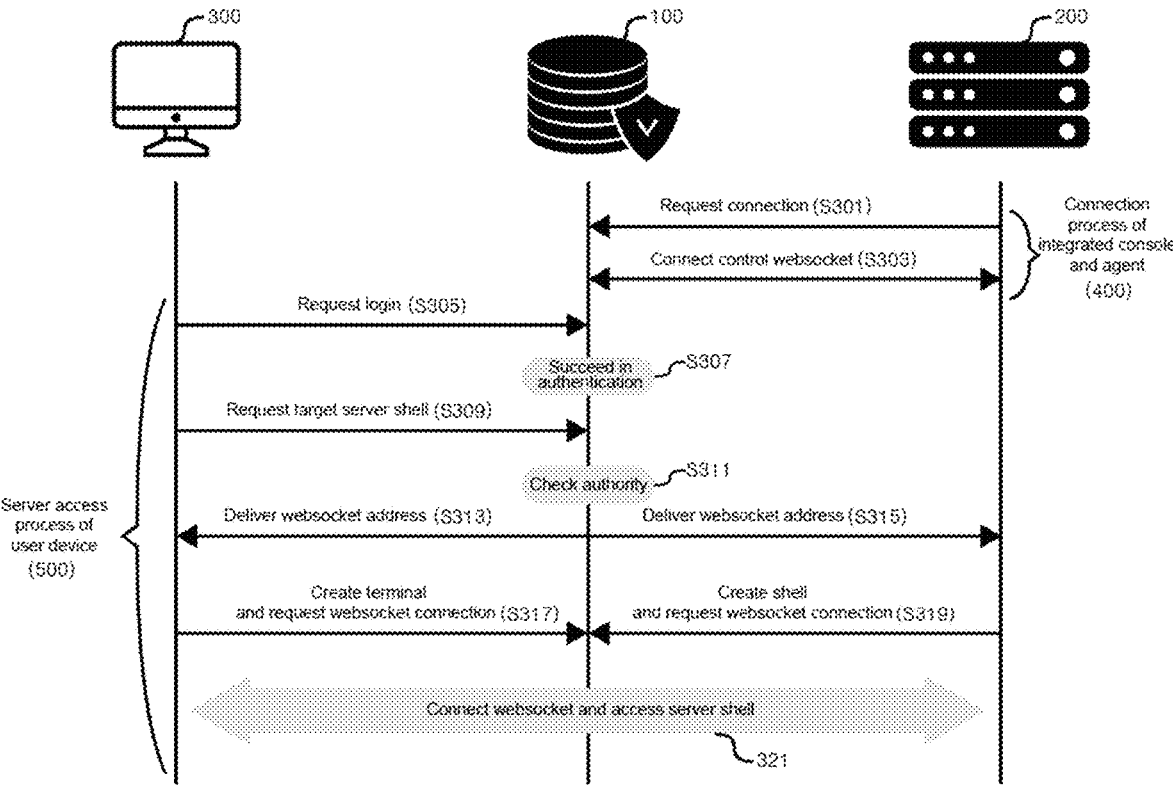
FIG. 3 shows a schematic flowchart for connection between the integrated console and the agent and connection between a user device and a server, in the extensible server management framework based on the reverse connection protocol according to various embodiments of the present disclosure.
Figure 4:
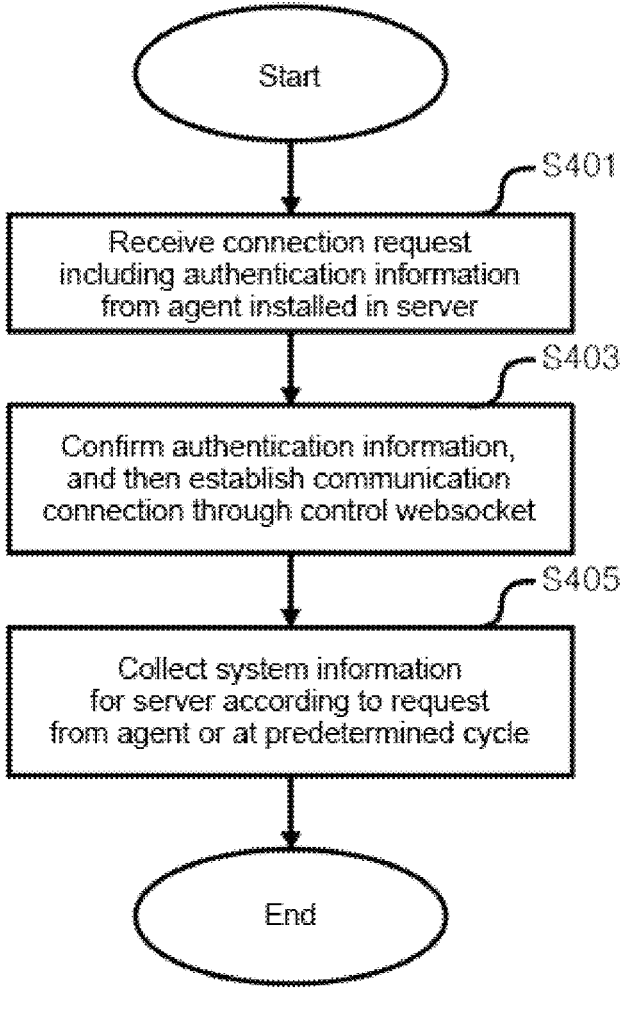
FIG. 4 is a flowchart of a connection process of the integrated console and the agent in the server management framework based on a reverse connection protocol according to various embodiments of the present disclosure.

Hereinafter, with reference to FIGS. 3 and 4, technical features, in which in the framework 10 according to various embodiments of the present disclosure, the agent 200 and the user device 300 establish the communication connection through the integrated console 100, and the integrated console 100 manages and controls the communication connection, will be described in detail. The processes shown and illustrated in FIGS. 3 to 4 are described as separate operations represented as independent blocks to facilitate understanding. However, the operations described separately as such should not be construed as necessarily being performed in a predetermined order in performing the operations. The performing order of the described processes should not be construed as a limitation, and any block(s) among the described process blocks may be combined in any order to implement the present process or an alternative process. Additionally, one or more of the provided operations may be modified or omitted.

The processes are shown as a collection of blocks in a logical flow diagram, which represent a series of operations that may be implemented as hardware, software, or a combination of hardware and software. For discussion purposes, the processes are described with reference to entities within the framework 10 described through FIGS. 1 to 2. However, the processes may also be performed using other systems and/or user interfaces.

FIG. 3 illustrates a schematic flowchart for connection between the integrated console and the agent and connection between a user device and a server, in the reverse connection protocol based extensible server management framework according to various embodiments of the present disclosure.

Referring to FIG. 3, the framework 10 according to various embodiments of the present disclosure may be divided into a connection step 400 of the integrated console 100 and the agent 200 and a process 500 for the user device 300 to access the server 201. In other words, the process 500 may connect communication between the user device 300 and the agent 200 installed on the server 201 through the integrated console 100.

The process 400 may include step S301 in which the integrated console 100 requests a connection to the agent 200, and step S303 in which the integrated console 100 and the agent 200 access each other through a control websocket connection in response thereto. The connection process 400 of the integrated console 100 and the agent 200 will be described in detail through FIG. 4.

The process 500 may start at step S305 in which the user device 300 transmits a signal for requesting login to the integrated console 100. Step S307 in which the integrated console 100 authenticates the user device 300 may be followed. In step S307, the integrated console 100 (or authentication processing unit 120) may confirm a user token of the user device 300, etc. Step S309 may be followed in which when the integrated console 100 authenticates the user device 300, the user device 300 transmits, to the integrated console 100, a signal for requesting a shell of a target server to be accessed. Step S311 may be followed in which the integrated console 100 confirms whether the user device 300 has an authority to access the server 201 in response to receiving the access request signal of the user device 300.

The process 500 may proceed to steps S313 and S315 in which the integrated console 100 transmits a connection websocket address to each of the user device 300 and the agent 200 when it is determined that the user device 300 has the authority to access the server 201. Step S317 may be performed in which the user device 300 receiving the websocket address from the integrated console 100 creates a terminal, and transmits, to the integrated console 100, the signal for requesting the connection by the connection websocket. In addition, step S319 may be performed in which the agent 200 receiving the connection websocket address from the integrated console 100 creates the shell, and transmits, to the integrated console 100, the signal for requesting the websocket connection. Step S321 may be performed in which the user device 300 and the agent 200 establish the communication connection through the websocket by performing steps S317 and S319. In other words, the user device 300 may access the server 201 through the webshell of the agent 200.

In other words, in the present disclosure, the reverse connection protocol based server management framework structure includes the user device, the agent installed in the server, and the integrated console, wherein the agent may be configured to request the communication connection to the integrated console by the reverse connection protocol according to the command received from the integrated console.

The integrated console may be configured to transmit an address of a control socket to the agent in response to receiving the request of the communication connection from the agent, and establish the communication connection with the agent through the control socket.

The integrated console may be further configured to transmit an address of a connection socket to each of the user device and the agent in response to receiving an access request to the server from the user device, and the agent may be configured to create a shell and request the communication connection to the address of the connection socket, in response to receiving the address of the connection socket transmitted by the integrated console.

Further, the user device may be further configured to create the terminal and request the communication connection to the address of the connection socket, in response to receiving the address of the connection socket transmitted by the integrated console, and the user device and the server may be configured to establish the communication connection through the connection socket, and the user device may be configured to control the server in real time through the shell.

Through this, the reverse connection protocol based server management framework structure according to an embodiment of the present disclosure may additionally include an integrated console that relays the user device and the server to be communication-connected by, for example, the reverse shell protocol or the SSH reverse tunneling protocol instead of the SSH or PAM type connection protocol of a zone with respect to the communication connection between the user device and the server.

In other words, the present disclosure enables real-time two-way communication between the user device and the agent (service) through the socket, and allows the user device to control the agent (server) by using the shell created by the agent, thereby providing a reverse connection protocol based server framework structure with practicality and extensibility reversely using shell technology used by attackers such as hackers at the time of attacking the server.

FIG. 4 is a flowchart of a connection process of the integrated console and the agent in the reverse connection protocol based server framework according to various embodiments of the present disclosure.

Referring to FIG. 4, the process 400 may start in step S401 in which the integrated console 100 receives a connection request including authentication information from the agent 200 installed in the server 201. Prior to step S401, a user or an operator of the server 201 may install the agent 200 in the server 201. The agent 200 may be a webshell program.

The integrated console 100 may issue and store authentication information to be used with respect to the server 201. The authentication information to be used with respect to the server 201 may be achieved by a request of the user or the operator of the server 201. The authentication information may be a universally unique identifier (UUID) including an ID and a KEY. The integrated console 100 may issue the authentication information according to the request of the operator of the server 201.

Specifically, the user authenticated as in step 401 accesses the integrated console 100 through a tool supporting a browser and a web protocol to manage the server 201 and/or the agent 200. The integrated console 100 may provide a server related page which may show a list of registered servers and information of individual servers for server management and IAM related pages capable of managing a user account and a user group for the operator of the server 201. The operator of the server 201 may send and receive data to and from the integrated console 100 through the REST API, which may be implemented using a web framework which may use the data.

Next, the process 400 may proceed to step S403 in which the integrated console 100 and the agent 200 establish communication connection through the control websocket. In step S403, when the integrated console 100 receives a connection request from the agent 200, the integrated console 100 may confirm the authentication information, and then establish the communication connection with the agent 200 through the control websocket. The integrated console 100 may confirm whether the authentication information received from the agent 200 is valid, and authorize the access of the agent 200 to the integrated console 100 when the authentication information is valid. For the access of the agent 200 to the integrated console 100, the integrated console 100 may create the control websocket for the agent 200, and transmit the address of the control websocket to the agent 200. The agent 200 may establish the communication connection of the integrated console 100 through the access to the received address of the control websocket. The communication connection between the integrated console 100 and the agent 200 through the control websocket may be maintained at all times. Since the connection between the integrated console 100 and the agent 200 is made through the websocket, two-way communication (full-duplex) and real-time networking are possible.

Specifically, when the agent 200 receives the websocket address from the integrated console 100, the agent 200 may create the webshell using a terminal interface creation tool such as JavaScript Xterm.js, and then may connect to the received websocket address to access a server terminal. As such, in the framework 10 according to various embodiments of the present disclosure, since communication establishment between entities is made through a websocket based on JavaScript, various functions such as executing a webcode editor by clicking on a file in the webshell by using the extensibility and portability of JavaScript may be added.

Next, the process 400 may proceed to step S405 in which the integrated console 100 collects information on the server 201 from the information collection unit 250 according to a request from the agent 200 or at a predetermined cycle. Alternatively, the integrated console 100 may receive information including hardware information, time information, network information, etc., of the server 201, which are collected by the information collection unit 250 of the agent 200.

In step S405, the integrated console 100 may collect information from the agent 200 according to a predetermined rule. For example, when the connection between the integrated console 100 and the agent 200 is initially established, when the connection between the integrated console 100 and the agent 200 is terminated, and then established again, when the state of the agent 200 is changed by the command of the integrated console 100, when there is a particular request of the user or operator of the agent 200, and when it is determined that information update of the agents 200 in the framework 10 is required according to a predetermined cycle, it may be possible that the integrated console 100 collects the information from the agent 200.

In an embodiment, the agent 200 may collect system information of the server 201 through the system information collection unit 290. For example, the system information collection unit 290 may collect the system information by using a program called osquery. The system information collection unit 290 may collect general system information (system_info: including CPU, memory, hardware model/serial information) of the server 201, OS information (os- _version, including OS type and name, version, and platform information), system time information (uptime), group information (groups) included in the system, user information (users) registered in the system, network interface information (interface_details), an IP allocation state of a network interface (interface_addresses), and package information (packages) installed in the system. The agent 200 (or system information collection unit 290) may collect the system information, and then transmit the system information to the integrated console 100 through the API. The system information which the agent 200 transmits to the integrated console 100 may follow a JavaScript based JSON (JavaScript Object Notation) specification.

As such, in the framework 10 according to various embodiments of the present disclosure, the integrated console 100 may unify a webshell interface based server management system into the integrated console 100 by establishing the process 400 with each of a plurality of agents 200.

The webshell interface based server management framework 10 according to various embodiments of the present disclosure may include a user device 300, an agent 200 installed in a server 201, and an integrated console 100, and the agent 200 may be configured to request connection to the integrated console 100 by a reverse connection protocol (e.g., a reverse shell protocol or an SSH reverse tunneling) according to a command received from the integrated console 100, and the integrated console (100) may be configured to receive an access request to the server 201 from the user device 300, and transmit an address of a connection socket to the user device 300 and the agent 200.

The agent 200 may be configured to create a shell, and request communication connection for the address of the connection socket, in response to receiving the address of the connection socket from the integrated console 100. The user device 300 and the server 201 may establish the communication connection through the connection socket.

In the framework 10 according to various embodiments of the present disclosure, the address of the connection socket may be defined by a websocket protocol, and two-way communication (full-duplex) and real-time networking may be possible.

In the framework 10 according to various embodiments of the present disclosure, the integrated console 100 may be further configured to perform an authentication for a universally unique identifier (UUID) received from the agent 200, and transmit an address of a control socket to the agent 200 when it is determined that the authentication is valid, and the agent 200 may be configured to be communication-connected to the integrated console through the control socket, and the address of the connection socket may be transmitted/received through the control socket.

In the framework 10 according to various embodiments of the present disclosure, the integrated console 100 may collect system information of the server 201 from the agent 200.

In the framework 10 according to various embodiments of the present disclosure, the integrated console 100 may be configured to determine whether the access of the user device 300 to the server 201 is authorized in response to receiving the access request to the server 201 from the user device 300, and when it is determined that the access of the user device 300 to the server 201 is authorized, transmit the address of the connection socket to the agent 200.

In the framework 10 according to various embodiments of the present disclosure, when it is determined that the access of the user device 300 to the server 201 is authorized, the integrated console 100 may transmit a session ID, a terminal size, and information on the user device to the agent 200.

In the framework 10 according to various embodiments of the present disclosure, when receiving the address of the connection websocket from the integrated console 100, the user device 300 and the agent 200 may be configured to determine whether the address is valid, and when it is determined that the address is valid, access the address of the connection websocket.

In the framework 10 according to various embodiments of the present disclosure, the integrated console may be configured to receive a sharing signal for the server from the user device, and transmit the address of the connection socket to the other user device. The other user device may be configured to access the address of the connection socket to share a session of the shell.

In the framework 10 according to various embodiments of the present disclosure, the sharing request signal may further include information on an authority degree of the other user device.

In the framework 10 according to various embodiments of the present disclosure, the integrated console 100 may be configured to receive a file upload request signal to the server 201 from the user device 300, receive a file from the user device 300, and transmit a download command signal for the file to the agent 200, and the agent 200 may be configured to transmit a download request signal to the integrated console 100 and download the file in response to receiving the download command signal.

In the framework 10 according to various embodiments of the present disclosure, when receiving the file upload request signal to the server 201 from the user device 300, the integrated console 100 may be further configured to determine whether the user device 300 has an upload authority to the server 201.

Figure 5:
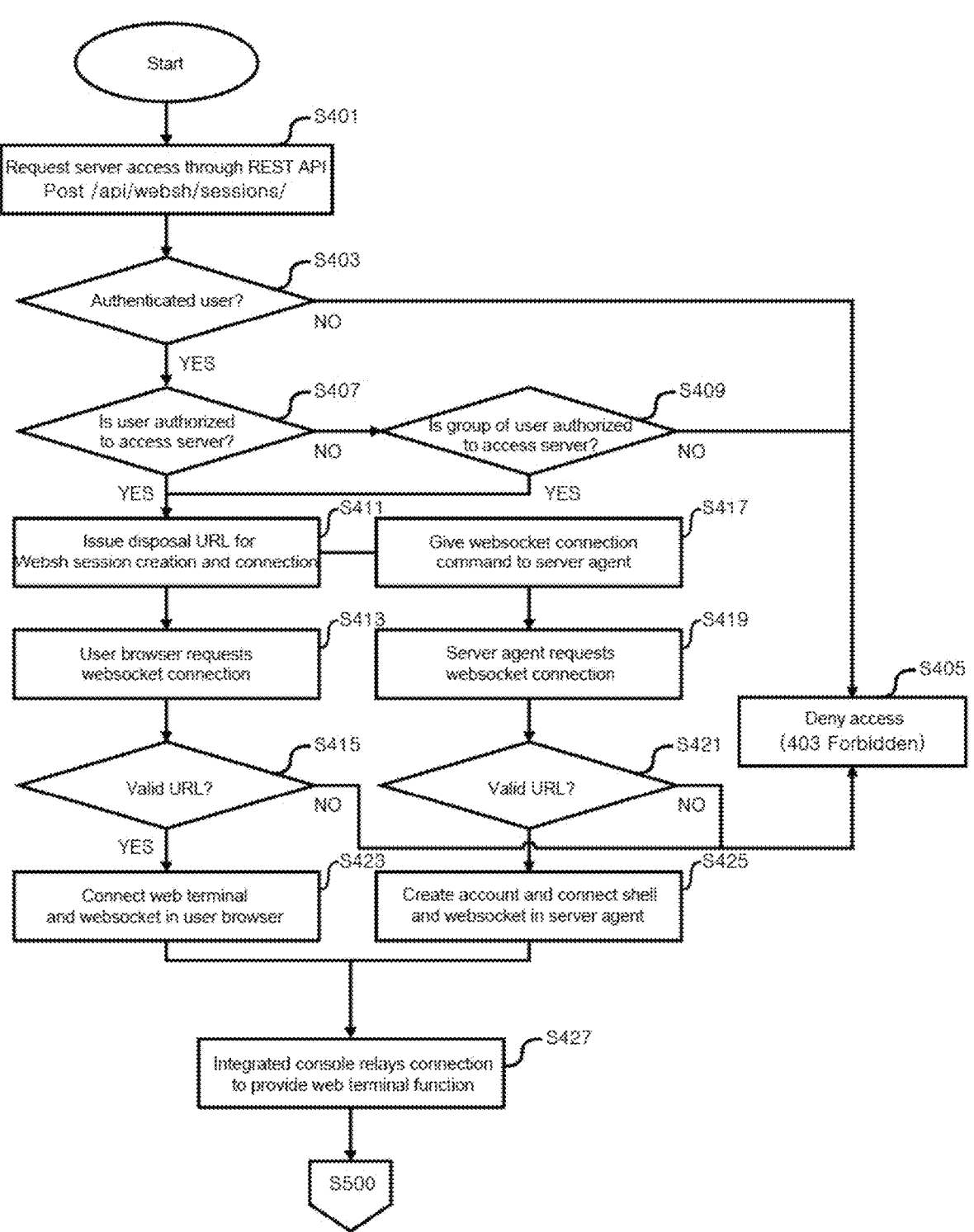
FIG. 5 is a flowchart of a server connection process of the use device through the integrated console in the server management framework based on a reverse connection protocol according to various embodiments of the present disclosure.

FIG. 5 is a flowchart of a server connection process of the use device through the integrated console in the reverse connection protocol based server management framework according to various embodiments of the present disclosure.

Referring to FIG. 5, the process 430 may start in step S401 in which the user device 300 requests the access to the server 201 to the integrated console 100. Step S401 may be the same as or similar to step S301 described in FIG. 3.

In step S401, the user device 300 may transmit the access request signal to the server 201 to the integrated console 100 through REST API. For example, the user device 300 may transmit a command signal of "REST/api/websh/sessions/" to the integrated console 100.

Next, the process 430 may proceed to step S403 in which the integrated console 100 determines whether the user device 300 transmitting the server access request signal is an authenticated user. Step S403 may be the same as or similar to step S307 described in FIG. 3. When the integrated console 100 determines that the user device 300 is an unauthenticated user in step S403, the process proceeds to step S405 of denying the access, so the process may be terminated.

When it is determined that the user sending the access request signal in the user device 300 is the authenticated user in the step S403, the process may proceed to step S407 of determining whether the user or the user device 300 is authorized to access the server 201. When it is determined that the user device 300 is not authorized to access the server 201, the process proceeds to step S405 of denying the access, so the process may be terminated. In another embodiment, when it is determined that the user device 300 is not authorized to access the server 201 in step S407, the process may proceed to step S409 of determining whether a group of the user or the user device 300 is authorized to access the server 201. When it is determined that the group of the user or the user device 300 is not authorized to access the server 201 in step S409, the process proceeds to step S405 of denying the access, so the process may be terminated. In other words, step S409 may be selectively performed.

When it is determined that the user or the user device 300 is authorized to access the server 201 in step S407 or selectively in step S409, the process may proceed to step S411 of creating a webshell session and issuing a connection websocket address.

In step S413, the user device 300 may transmit a websocket connection request signal to the integrated console 100 by using a connection websocket address through a web browser of a user device.

In step S415, the integrated console 100 may determine whether an address of the connection websocket address transmitted by the user device 300 is valid, in response to receiving the websocket connection request signal received from the user device 300. For example, the integrated console 100 may compare a TOKEN ID value for authorizing a session included in the signal transmitted by the user device 300.

In step S417, the integrated console 100 may transmit, to the user device 300, the connection websocket address (URL) created in step S411. Further, in step S415, the integrated console 100 may transmit, to the agent 200, a websocket connection command signal jointly with the connection websocket address (URL) created in step S411.

In step S419, the agent 200 may transmit a websocket connection request signal to the integrated console 100 in response to receiving the websocket connection command signal from the integrated console 100.

In step S421, the integrated console 100 may determine whether an address of the websocket connection request signal transmitted by the agent 200 is valid, in response to receiving the websocket connection request signal received from the agent 200.

In step S423, the user device 300 may create a web terminal in the web browser, and may be connected to the connection websocket. In step S425, the agent 200 may create a webshell (or account), and may be connected to the webshell and the connection websocket.

In step S427, the integrated console 100 may relay each of the agent 200 and the user device 300 connected through the connection websocket to provide a web terminal function or a gateway function. After step S427, the process 500 may include a unique function which may be performed as the user device 300 and the server 201 are communication-connected through the webshell created by the agent 200.

Figure 6:
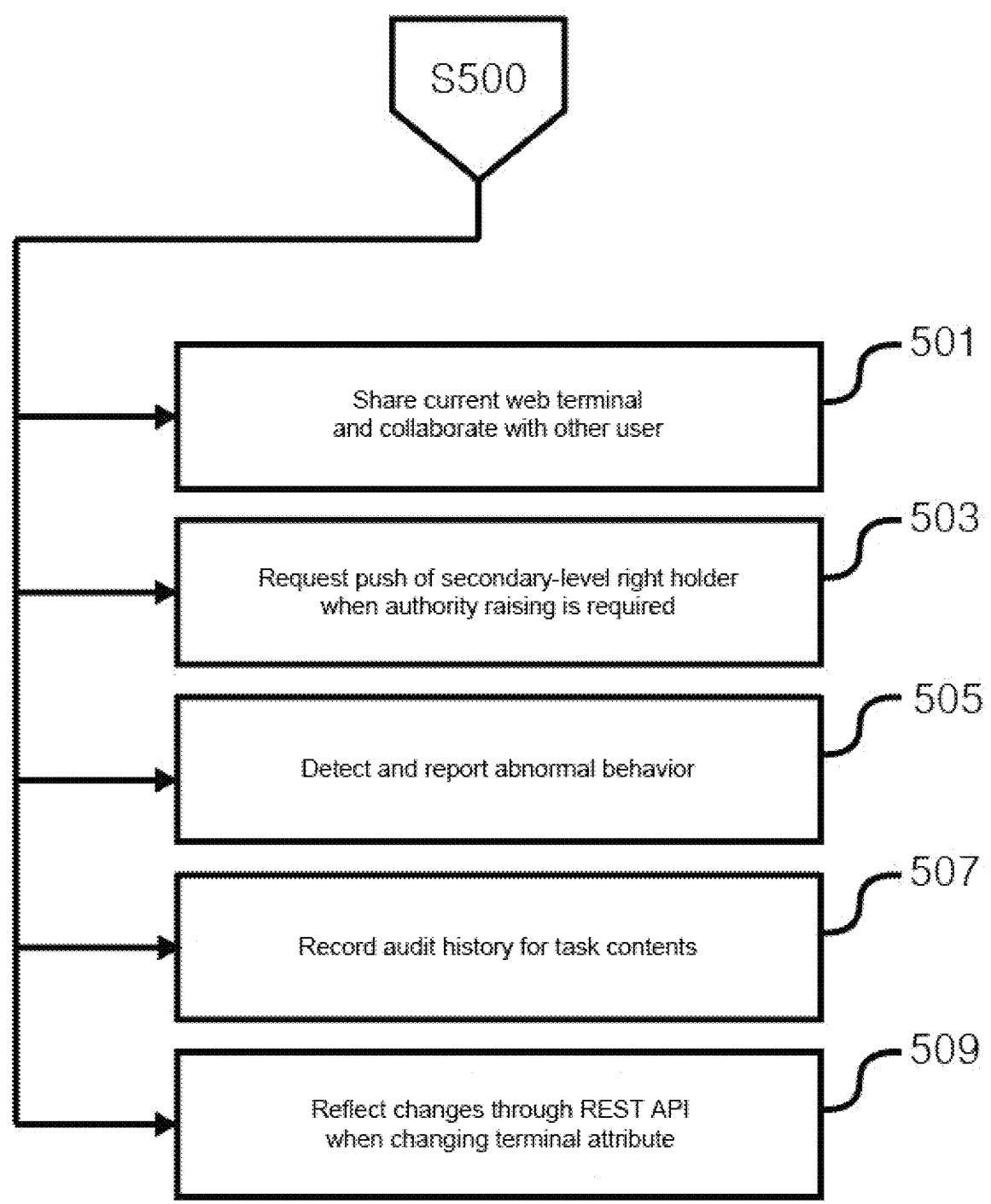
FIG. 6 shows a function which can be performed through the connection of the server and the user device through the integrated console in the server management framework based on a reverse connection protocol according to various embodiments of the present disclosure.

FIG. 6 shows a function which can be performed through the connection between the server and the user device through the integrated console in the server management framework based on a reverse connection protocol according to various embodiments of the present disclosure.

Referring to FIG. 6, in the process 500, the unique function which may be performed as the user device 300 and the server 201 are communication-connected through the webshell created by the agent 200 may include a function 501 of sharing a current web terminal and collaborating with the other user if necessary, a function 503 of push-requesting to a secondary-level right holder when the authority is raised, a function 505 of detecting and reporting abnormal behavior, a function 507 of recording an audit history for task contents, and a function 509 of reflecting changes through the REST API when a terminal attribute is changed.

Specifically, in the function 501 of sharing the current web terminal and collaborating with the other user if necessary, the user device 300 and the agent 200 share a currently connected session by web link transfer to enable the other user to view a terminal which is currently working equally. In an embodiment, it may be possible to set a session password.

In the case of sharing of the session according to various embodiments of the present disclosure, instead of browser or background screen sharing, a "web terminal" screen which is currently performing a coding or command task input by the user may be share, and simultaneous working may be enabled.

For example, it may be possible to collaborate with the other user through chatting with the other user who shares the session while sharing the session. For example, while a user who is a manger and a user who is an outsourcing worker view the screen, the outsourcing worker may perform an actual task and the manager may monitor the contents or present an opinion. The manager may also directly perform the actual task as necessary.

The process for the sharing function 501 may be configured so that the integrated console 100 receives a sharing request signal for the server 201 from the user device 300, and transmits an address of a connection socket (websocket URL) capable of accessing the terminal to the other user device 300.

Specifically, the user inputs a session sharing button as a graphic user interface (GUI) provided to the screen in a state of being connected to the webshell (Websh) provided by the agent 200 to transmit the sharing request signal. In an embodiment of the present disclosure, when the user starts sharing, the other user may select only reading or whether both reading and writing are enabled.

In an embodiment of the present disclosure, the integrated console 100 may create a disposable HTTP URL and a disposable password when receiving the session sharing request from the user device 300. The other user who receives the disposal HTTP URL accesses the URL and inputs the password to request session participation to the integrated console 100. When authentication of the password input from the other user device 300 is validly completed, the integrated console 100 may issue the address of the connection socket capable of accessing the terminal to the other user device 300.

Again, the other user device 300 that receives the address of the connection websocket accesses the address of the connection socket to share the session of the shell. The other user device 300 may access the websocket, and interlock the socket with a web terminal interface I/O of the browser.

The integrated console 100 may relay an input and an output between the original user device 300 and the agent 200 to the websocket of another user device 300 who shares the session equally.

In an embodiment of the present disclosure, the other user device 300 may receive a notification (or prompt) that the terminal is connected, and may use the terminal.

The secondary-level right holder push requesting function 503 when raising the authority is necessary may be performed when a task of requesting a specific authority during a normal task among tasks which a user who is a member of a group performs by accessing the server 201 through the agent 200 and the user device 300, for example, when a task such as software package installation, web server restart, or system service registration is generated.

At this time, the worker may request an authority required for executing the command to an upper right holder. In other words, the user device 300 may transmit a signal of requesting the authority to the user device 300 of the upper right holder having the authority required for executing the command to the integrated console. In an embodiment of the present disclosure, when the integrated console 100 receives a signal of requesting the authority from the worker, the identity management unit 130 may retrieve the upper right holder (or the user device 300 of the upper right holder) based on group information of the worker.

The upper right holder may receive the contents through the notification, and accept or deny the contents. The worker may perform the corresponding command according to an acceptance result, and perform a subsequent task.

The abnormal behavior detection and reporting function 505 may mean a function in which the integrated console 100 manages the audit history for the task contents performed by the user device 300 (507), and detects the abnormal behavior, and provides the audio history to a monitoring right person or an upper right holder when the abnormal behavior occurs.

Likewise, the integrated console 100 may store the changes, and share and push the changes through the REST API when changing the terminal attribute.

Figure 7:
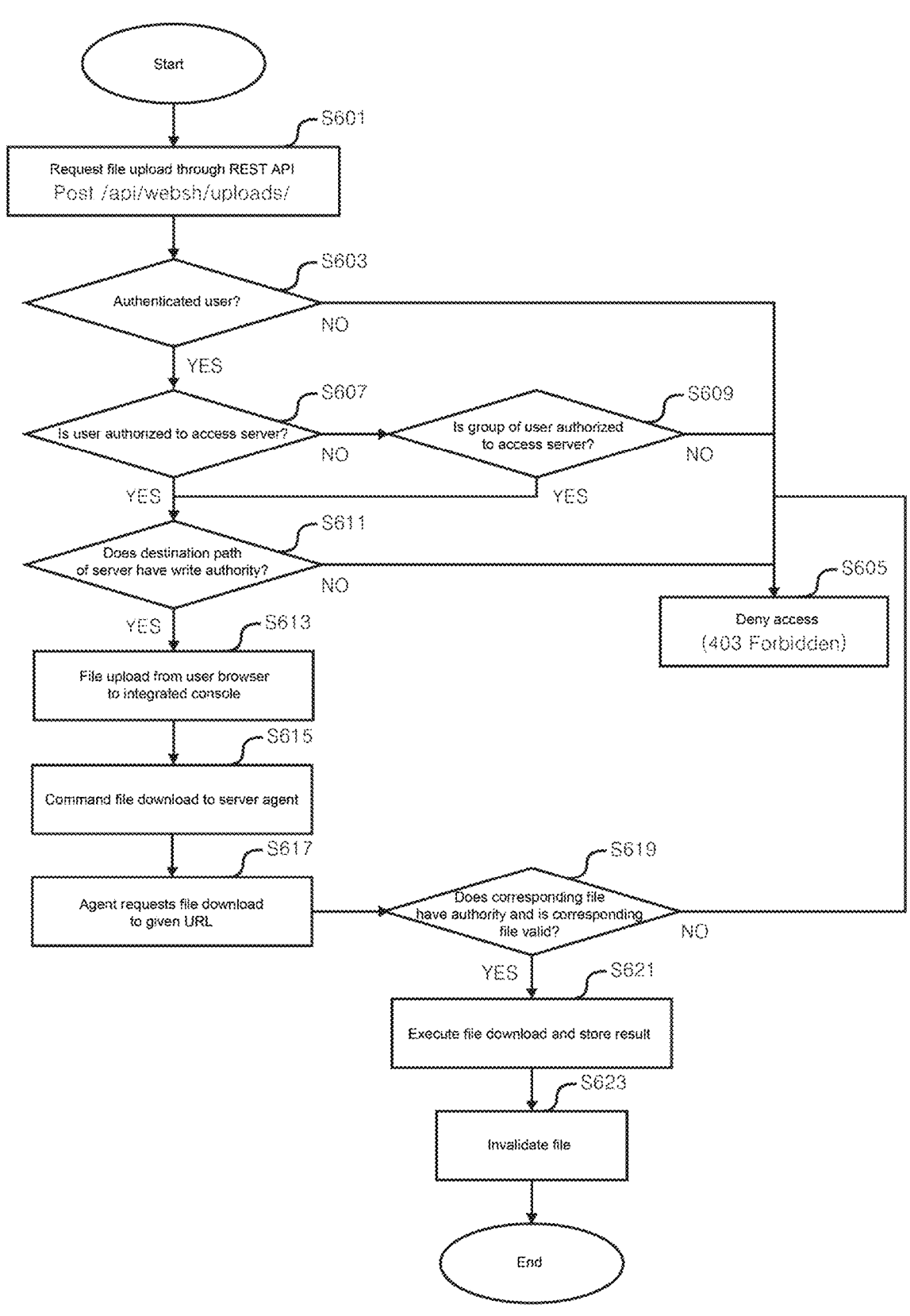
FIG. 7 is a flowchart of a process of uploading a file to the server through the integrated console by the user device in the server management framework based on a reverse connection protocol according to various embodiments of the present disclosure.

FIG. 7 is a flowchart of a process of uploading a file to the server through the integrated console by the user device in the server management framework based on a reverse connection protocol according to various embodiments of the present disclosure.

Referring to FIG. 7, the process 600 may start in step S601 in which the user device 300 requests the access to the server 201 to the integrated console 100. Meanwhile, user authentication steps in step S601 to S609 are substantially the same as or similar to steps S401 to S409 described in FIG. 5, so an overlapping description will be omitted.

In step S611, the integrated console 100 may determine whether the user device 300 or the user has a write authority or an upload authority onto the server 201 as a destination. When the integrated console 100 determines that the user device 300 does not have the write authority in step S611, the process proceeds to step S605 of denying the access, so the process may be terminated.

When the integrated console 100 determines that the user device 300 has the write authority in step S613, the user device 300 may transmit a file to the integrated console 100. In other words, the user device 300 may upload the file to the integrated console 100 by using the web browser.

In step S615, when the integrated console 100 starts (or completes) reception of the file from the user device 300, the integrated console 100 may transmit a file download command signal to the agent 200. The download command signal may include a file downloadable address.

In step S617, the agent 200 may transmit a file download request signal to the integrated console 100 in response to receiving the download command signal from the integrated console 100.

In step S619, the integrated console 100 may determine whether the agent 200 has the authority for the file and is valid, and when the agent 200 does not have the authority or is not valid, the process proceeds to step S605 of denying the access, so the process may be terminated.

In step S619, when the integrated console 100 determines that the agent 200 has the authority for the file and is valid, the process may proceed to step S621 in which the agent 200 downloads the file, and stores such a result.

The process 600 may selectively proceed to step S623 to invalidate the file or information on the file stored in the integrated console 100. A security for the file uploaded from the user device 300 to the server may be maintained.

As the process 600 described in FIG. 7, a process in which the user device 300 uploads the file to the server 201 is described, but as a similar process, the user device 300 may download the file of the server 201. For example, the user who accesses the server 201 in the user device 300 may select a file to be downloaded among the files stored in the server 201, and transmit a signal for requesting downloading of the file to the integrated console 100. The integrated console 100 may transmit an upload request signal and an address (e.g., HTTP) for the file to the agent 200, and the agent 200 may upload the file to the integrated console 100 in response thereto. When the file upload from the agent 200 is completed, the integrated console 100 may download the file to the user device 300.

As such, the user device 300 may upload the file to the server 201 or download the file of the server 201 through the process 600, and the integrated console 100 serving as the terminal may request the upload or download of the file for the server 201 to the agent 200 by the reverse connection protocol.

Figure 8:
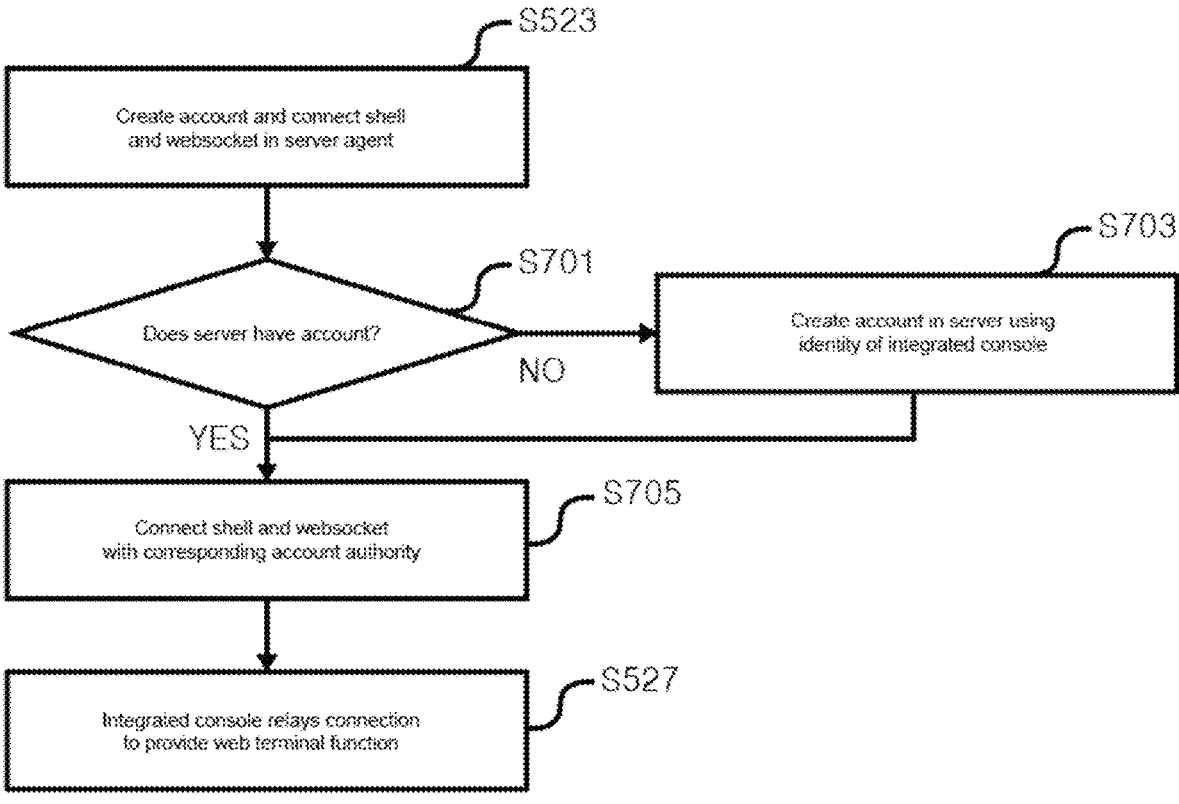
FIG. 8 shows a process for management of an integrated identity and an authorization in the server management framework based on a reverse connection protocol according to various embodiments of the present disclosure.

FIG. 8 shows a process for management of an integrated identity and an authorization in the server management framework based on a reverse connection protocol according to various embodiments of the present disclosure. Referring to FIG. 8, the process 700 corresponds to a process which may be additionally executed between steps S425 and S427 described in FIG. 5.

In step S701, the integrated console 100 determines whether the agent 200 has an account, and when the agent 200 has the account, the process may proceed to step S705 of connecting the webshell and the websocket with an authority of the account. In step S701, determining whether the agent 200 has the account may include identifying a group including the user and identifying an individual account of the user.

In step S701, when it is determined that the agent 200 does not have the account, the integrated console 100 may transmit account information to the agent 200, and the agent 200 may create the account information by using the received account information. Specifically, in step S701, when it is determined that there is no account of the group including the user or no individual account of the user, the integrated console 100 may transmit the account information to the agent 200, and the agent 200 may create the account information by using the received account information. The agent 200 may create the account information in step S703, and then the process may proceed to step S705 of connecting the webshell and the websocket with the account authority. Meanwhile, in describing the present disclosure, it is apparent to those skilled in the art that the socket may be communication-connected based on a TCP/IP protocol other than the websocket protocol.

The webshell interface based server management framework 10 according to various embodiments of the present disclosure may include a user device 300, an agent 200 installed in a server 201, and an integrated console 100, wherein the agent 200 may be configured to request connection to the integrated console 100 by a reverse connection protocol, e.g., a reverse shell protocol or an SSH reverse tunneling protocol according to a command received from the integrated console 100, and the integrated console 100 may be configured to receive an access request to the server

201 from the user device 300, and transmit an address of a connection socket to the user device 300 and the agent 200.

The agent 200 may be configured to create a shell, and request communication connection for the address of the connection socket, in response to receiving the address of the connection socket from the integrated console 100. The user device 300 and the server 201 may request the communication connection to the integrated console 100 through the connection socket, and the integrated console 100 may be configured to mediate the connection of the user device 300 and the agent 200 when both the user device 300 and the agent 200 are connected to the connection socket.

In the reverse connection protocol based server management framework according to various embodiments of the present disclosure, commands and requests transmitted/received between the integrated console 100 and the agent 200 may be transmitted/received through the REST API or the connection websocket, the agent 200 may create a shell based on JavaScript, and perform an access to an address of the connection socket, the address of the connection socket may be defined by a websocket protocol, and two-way communication (full-duplex) and real-time network may be possible.

In the reverse connection protocol based server management framework according to various embodiments of the present disclosure, when receiving the address of the connection websocket from the integrated console 100, the user device 300 and the agent 200 may be configured to determine whether the address is valid, and when it is determined that the address is valid, access the address of the connection websocket.

In the reverse connection protocol based server management framework according to various embodiments of the present disclosure, the integrated console 100 may be configured to receive a sharing request signal for the server 201 from the user device 300 and transmit the address of the connection socket to the other user device, and the other user device may be configured to share a session of the shell by accessing the address of the connection socket.

In the reverse connection protocol based server management framework according to various embodiments of the present disclosure, the integrated console 100 may be configured to create a disposable HTTP URL and a disposable password, and transmit the disposable HTTP URL and password to the other user device in response to receiving the sharing request signal for the server 201 from the user device 300, and transmit the address of the connection socket to the other user device when authentication of the password which the other user device inputs by accessing the disposable HTTP URL.

In the reverse connection protocol based server management framework according to various embodiments of the present disclosure, the integrated console 100 may be configured to receive a file upload request signal to the server 201 from the user device 300, receive a file from the user device 300, and transmit a download command signal for the file to the agent 200, and the agent 200 may be configured to transmit a download request signal to the integrated console 100 and download the file in response to receiving the download command signal.

In the reverse connection protocol based server management framework according to various embodiments of the present disclosure, when receiving the file upload request signal to the server 201 from the user device 300, the integrated console 100 may be further configured to determine whether the user device 300 has an upload authority to the server 201.

In the reverse connection protocol based server management framework according to various embodiments of the present disclosure, when the agent 200 completes downloading of the file, the integrated console 100 may be further configured to invalidate the file.

In the reverse connection protocol based server management framework according to various embodiments of the present disclosure, when the integrated console 100 receives an authority raising request from the user device 300 connected to the server 201 by the address of the connection socket, the integrated console 100 may retrieve a secondary-level right holder in a group to which the user device belongs, transmit a notification for requesting raising of the authority to the other user device of the secondary-level right holder, and adjust the authority of the user device based on receiving a signal indicating acceptance or denial from the other user device of the secondary-level right holder.

In the reverse connection protocol based server management framework according to various embodiments of the present disclosure, the integrated console 100 may confirm whether the user device 300 has an account for the server 201, and when it is confirmed that the user device does not have the account for the server, the integrated console 100 may be configured to create the account for the server by using identity information stored in a database within the integrated console, and mediate the connection of the user device and the agent by using the created account.

The aforementioned description of the present disclosure is for exemplification, and it can be understood by those skilled in the art that the present disclosure can be easily modified in other detailed forms without changing the technical spirit or requisite features of the present disclosure. Therefore, it should be understood that the above-described embodiments are illustrative in all aspects and do not limit the present disclosure. For example, respective components described as single types can be distributed and implemented, and similarly, components described to be distributed can also be implemented in a coupled form.

Hereinabove, a subject to be claimed in the present disclosure has been described in detail. The subject claimed in the present disclosure is not limited in scope to the specific implementation examples described above. For example, in any implementation example, the subject may be in the form of hardware operatively used on a device or a combination of devices, in another implementation example, the subject may be implemented in the form of software and/or firmware, and in still another implementation example, the subject may include one or more items such as a signal bearing medium and a storage medium. Here, a storage medium such as a CD-ROM, a computer disk, a flash memory, etc., when executed by a computing device such as, for example, a computing system, a computing platform, or other system, may store instructions which cause execution of the corresponding processor according to the implementation example described above. Such a computing device may include one or more processing units or processors, one or more input/output devices such as a display, a keyboard, and/or a mouse, and one or more memories such as static random access memory, a dynamic random access memory, a flash memory, and/or a hard drive.

The foregoing detailed description describes various embodiments of devices and/or processes through block diagrams, flowcharts, and/or other examples. Such block diagrams, flowcharts, and/or other examples will include one or more functions and/or operations, and those skilled in the art will understand that each function and/or operation within the block diagrams, flowcharts, and/or other examples may be individually or collectively implemented by hardware, software, firmware, or any combination thereof. In various embodiments, some portions of the subject described in the present disclosure may be implemented via an Application Specific Integrated Circuit (ASIC), Field Programmable Gate Array (FPGA), Digital Signal Processor (DSP), or other forms of integration. Alternatively, some aspects of the embodiments of the present disclosure may be totally or partially equivalently implemented in the integrated circuit by one or more computer programs executed on one or more computers (e.g., one or more programs executed on one or more computer systems), one or more programs executed on one or more processors (e.g., one or more programs executed on one or more microprocessors), firmware, or any substantial combination thereof, and writing codes for software and/or firmware, and/or design of circuits are belong to the technical scope of those skilled in the art in light of the present disclosure. Further, those skilled in the art will understand that the mechanisms of the subject of the present disclosure may be distributed in a variety of program products, and the examples of the subject of the present disclosure apply regardless of the specific type of signal bearing medium used to actually perform the distribution.

Although specific example techniques have been described and shown herein using various methods and systems, those skilled in the art will recognize that various other modifications or equivalent substitutions may occur without departing from the claimed subject. Additionally, many modifications may be made to adapt the teachings of the claimed subject to specific circumstances without departing from the central concept described herein. Accordingly, it is intended that although the claimed subject is not limited to the specific examples disclosed, such claimed subject may also include all embodiments that fall within the scope of the appended claims and their equivalents.

The scope of the present disclosure is represented by claims to be described below rather than the detailed description, and it is to be interpreted that the meaning and scope of the claims and all the changes or modified forms derived from the equivalents thereof are included within the scope of the present disclosure.

What is claimed is:

1. A server management framework based on a reverse connection protocol, comprising:

a user device;

an agent installed in a server; and an integrated console, the integrated console including an authentication module, a reverse connection manager, and a websocket server, wherein the agent is configured to request a communication connection to the integrated console by the reverse connection protocol according to a command received from the integrated console, wherein the integrated console is configured, in response to receiving an access request for the communication connection from the agent, to authenticate a universally unique identifier (UUID) received from the agent and, when the authentication is determined to be valid, to transmit an address of a control socket to the agent so that the communication connection between the integrated console and the agent is established through the control socket, wherein the integrated console is configured, in response to receiving an access request to the server from the user device, to cause the websocket server to generate a single-use and time limited connection websocket for a session and to transmit an address of the connection websocket to the user device and the agent, wherein the agent is configured, in response to receiving the address of the connection websocket from the integrated console, to create a shell and to request a communication connection to the address of the connection websocket, wherein the user device is configured, in response to receiving the address of the connection websocket from the integrated console, to create a terminal and request a communication connection to the address of the connection websocket, wherein the user device and the server are configured to establish a communication connection therebetween through the connection websocket, and the user device is enabled to control the server in real time through the shell, and wherein the integrated console is configured to provide a server page including a list of registered servers for server management and information of each registered server, and an Identity Access Management (IAM) page for managing user accounts and groups.

2. The server management framework of claim 1, wherein the address of the connection websocket is defined by a websocket protocol, enabling two-way communication and real-time networking.

3. The server management framework of claim 1, wherein the command or request transmitted or received between the integrated console and the agent is carried through a REST API or the connection websocket.

4. The server management framework of claim 1, wherein the agent is configured to establish the communication connection to the integrated console through the control socket, and the address of the connection websocket is transmitted or received through the control socket.

5. The server management framework of claim 1, wherein the integrated console is further configured to collect system information of the server from the agent through the control socket.

6. An operation method of a server management framework based on a reverse connection protocol, the server management framework comprising a user device, an agent installed in a server, and an integrated console, wherein the agent is configured to request a communication connection to the integrated console by a reverse connection protocol according to a command received from the integrated console, the operation method comprising:

receiving, by the integrated console, an access request to the server from the user device;

causing, by the integrated console, a websocket server to generate a single-use and time-limited connection websocket for a session and transmitting, through a control socket, an address of the connection websocket to the user device and the agent;

creating, by the agent, a shell, and requesting a communication connection from the agent to the address of the connection websocket, in response to receiving the address of the connection websocket from the integrated console, and mediating, by the integrated console, a communication connection between the user device and the server through the connection websocket.

7. The operation method of claim 6, wherein the address of the connection websocket is defined by a websocket protocol, enabling two-way communication and real-time networking.

8. The operation method of claim 6, wherein the command and request transmitted or received between the integrated console and the agent is carried through a REST API or the connection websocket.

9. The operation method of claim 6, further comprising:

authenticating, by the integrated console, a universally unique identifier (UUID) received from the agent;

transmitting, by the integrated console, an address of a control socket to the agent when the authentication is valid; and establishing, by the agent, the communication connection to the integrated console through the control socket, wherein the address of the connection websocket is transmitted or received through the control socket.

10. The operation method of claim 9, further comprising:

collecting, by the integrated console, system information of the server from the agent through the control socket.

11. The operation method of claim 10, wherein the system information is collected by an osquery program included in the agent.

12. A server management framework based on a reverse connection protocol, comprising:

a user device;

an agent installed in a server; and an integrated console, wherein the agent is configured to request a communication connection to the integrated console by a reverse connection protocol according to a command received from the integrated console, wherein the integrated console is configured to determine whether an access of the user device to the server is authorized in response to receiving an access request to the server from the user device, and when it is determined that the access of the user device to the server is authorized, transmit an address of a connection websocket to the user device and the agent, wherein the agent is configured to create a shell and request a communication connection to the address of the connection websocket, in response to receiving the address of the connection websocket from the integrated console, wherein the user device requests a communication connection to the address of the connection websocket, wherein the integrated consoler mediates a communication connection of the user device and the agent when both the user device and the agent are connected to the connection websocket, wherein the integrated console is configured to receive a sharing request signal for the server from the user device, to create a disposable HTTP URL and a disposable password, and to transmit the disposable HTTP URL and the disposable password to another user device in response to the sharing request, wherein, upon authentication of the disposable password input by accessing the disposable HTTP URL, the integrated console transmits the address of the connection websocket to the another user device, and wherein the another user device is configured to access the address of the connection websocket to share a session of the shell.

13. The server management framework of claim 12, wherein the command or request transmitted or received between the integrated console and the agent is carried through a REST API or the connection websocket, and the address of the connection websocket is defined by a websocket protocol, enabling two-way communication and real-time networking.

14. The server management framework of claim 12, wherein, when receiving the address of the connection websocket from the integrated console, the user device and the agent are configured to determine whether the address of the connection websocket is valid, and, when the address of the connection websocket is valid, to access the address of the connection websocket.

15. The server management framework of claim 12, wherein the integrated console is configured to:

receive a file upload request signal to the server from the user device;

receive a file from the user device; and transmit a download command signal for the file to the agent, wherein the agent is configured, in response to receiving the download command signal, to transmit a download request signal to the integrated console and to download the file.

16. The server management framework of claim 15, wherein, upon receiving the file upload request signal to the server from the user device, the integrated console is further configured to determine whether the user device has an upload authority to the server.

17. The server management framework of claim 15, wherein, when the agent completes downloading of the file, the integrated console is further configured to invalidate the file.

18. The server management framework of claim 12, wherein, when receiving an authority raising request from the user device connected to the server via the address of the connection websocket, the integrated console retrieves a secondary-level right holder in a group to which the user device belongs, transmits a notification of an authority raising request to a user device of the secondary-level right holder, and adjusts an authority of the user device based on a response signal indicating acceptance or denial from the user device of the secondary-level right holder.

19. The server management framework of claim 12, wherein the integrated console is configured to:

confirm whether the user device has an account for the server;

when it is confirmed that the user device does not have the account for the server, create the account for the server by using identity information stored in a database within the integrated console; and mediate the communication connection of the user device and the agent by using the created account.

20. An access method of a server management framework based on a reverse connection protocol, wherein the framework comprises a user device, an agent installed in a server, and an integrated console, and the agent is configured to request a communication connection to the integrated console by the reverse connection protocol according to a command received from the integrated console, the access method comprising:

determining, by the integrated console, whether an access of the user device to the server is authorized in response to receiving an access request to the server from the user device;

when the access of the user device to the server is authorized, causing, by the integrated console, a websocket server to generate a single-used and time-limited connection websocket for a session and transmitting, through a control socket, an address of the connection websocket to the user device and the agent;

creating, by the agent, a shell and requesting a communication connection to the address of the connection websocket, in response to receiving the address of the connection websocket from the integrated console;

requesting, by the user device, a communication connection to the address of the connection websocket; and mediating, by the integrated console, a communication connection of the user device and the agent when both the user device and the agent are connected to the connection websocket.

* * * * *